INVENTORS
Freerk J. Fontein and
Arthur L. de Gelder
By Cushman, Darby & Cushman
ATTORNEYS Sept. 29, 1953 F. J. FONTEIN ET AL 2,653,801

PROCESS AND APPARATUS FOR DISPERSING A SUBSTANCE IN A LIQUID

Filed Oct. 12, 1951 5 Sheets-Sheet 2

INVENTORS

Freerk J. Fontein and

Arthur L. de Gelder

By Cushman, Darby & Cushman

ATTORNEYS

Sept. 29, 1953 F. J. FONTEIN ET AL 2,653,801

PROCESS AND APPARATUS FOR DISPERSING A SUBSTANCE IN A LIQUID

Filed Oct. 12, 1951 5 Sheets-Sheet 3

INVENTORS

Freerk J. Fontein and

Arthur L. de Gelder

By Cushman, Darby & Cushman

ATTORNEYS

INVENTORS
Freerk J. Fontein and
Arthur L. de Gelder
By Cushman, Darby & Cushman
ATTORNEYS Sept. 29, 1953

F. J. FONTEIN ET AL

PROCESS AND APPARATUS FOR DISPERSING A SUBSTANCE IN A LIQUID 2,653,801

Filed Oct. 12, 1951

INVENTORS

Freerk J. Fontein and

Arthur L. de Gelder

By Cushman, Darby & Cushman

ATTORNEYS

Patented Sept. 29, 1953

2,653,801

UNITED STATES PATENT OFFICE 2,653,801

PROCESS AND APPARATUS FOR DISPERSING A SUBSTANCE IN A LIQUID

Freerk J. Fontein, Heerlen, and Arthur L. de Gelder, Stein, Netherlands, assignors to Stamicarbon N. V., Heerlen, Netherlands Application October 12, 1951, Serial No. 251,118
In the Netherlands October 13, 1950

15 Claims. (Cl. 259—4)

The present invention relates to a process and an apparatus for bringing one or more substances or a mixture of substances into contact with a liquid by finely dividing the substance or substances in the liquid or by mixing them therewith.

The liquid in which the component or components is to be finely divided or with which the component or components is to be mixed, may be a simple substance, although other substances may be dissolved, dispersed or emulsified therein. The substances to be finely divided or dissolved may be simple substances or mixtures of substances. Furthermore, these substances may be gaseous, liquid or solid. In the last-mentioned case, however, it is essential that the solid substance be already more or less finely divided.

An object of the invention is to provide an improved apparatus and process for performing chemical or physical reactions between a liquid or a substance dissolved, dispersed or emulsified in the liquid and one or more other components, the reaction rate depending upon the rate at which the substances are brought into contact with each other or upon the contact area between said components.

Another object is to provide an improved apparatus and process for making more or less stable emulsions or for preparing homogeneous solutions.

A further object of the invention is to provide an improved apparatus and process for finely dispersing a gas in a liquid, for purifying the liquid, or the gas or for aerating purposes. For example, the invention may be used in connection with the aerating of waste water, slime suspensions or other liquids, in which aerobic microbiological processes take place or in the preparation of alcohol, acetic acid and bactericides.

It is also an object of the invention to provide an improved apparatus and process for finely dispersing a liquid in a liquid for preparing emulsions or true solutions.

Still another object of the invention is to provide an improved apparatus and process for finely dispersing a granular substance in a liquid, for example, performing a heterogeneous catalytic reaction in the liquid state, the granular substance being the catalyst.

These and other objects of the invention will appear in the specification, claims and drawings wherein:

Figure 3A:
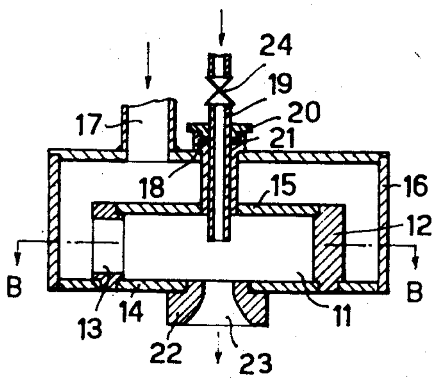

Figure 3*a* is a cross-sectional view of another modified form of the invention especially for use below the level of a liquid and taken on the line A—A of Figure 3*b*.

Figure 3B:
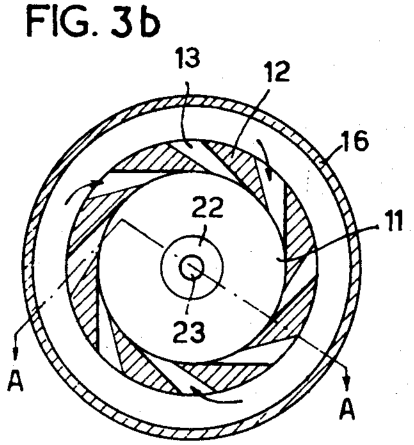

Figure 3*b* is a cross-sectional view taken on the line B—B of the apparatus shown in Figure 3*a*.

Figure 4A:
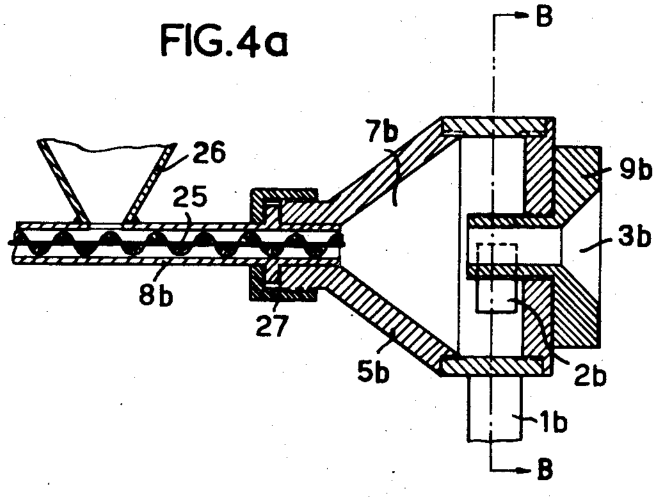
Figure 4B:
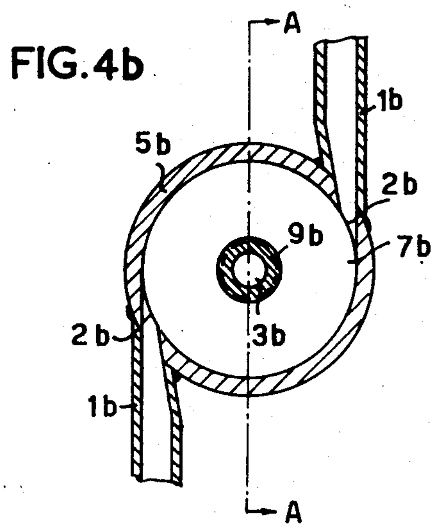

Figure 4*a* is a cross-sectional view of another modified form of the invention especially for use in aspirating finely divided solid mixtures or liquid mixtures of high viscosity and is taken on the line A—A of Figure 4*b*.

Figure 4*b* is a cross-sectional view taken on the line B—B of the apparatus shown in Figure 4*a*.

Figure 5A:
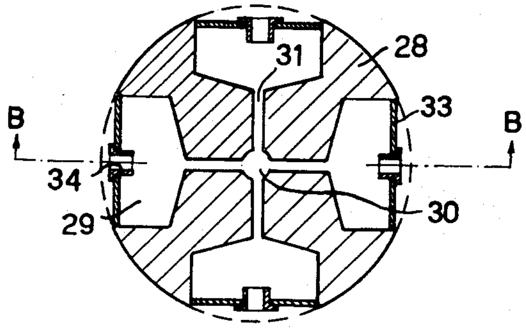
Figure 5B:
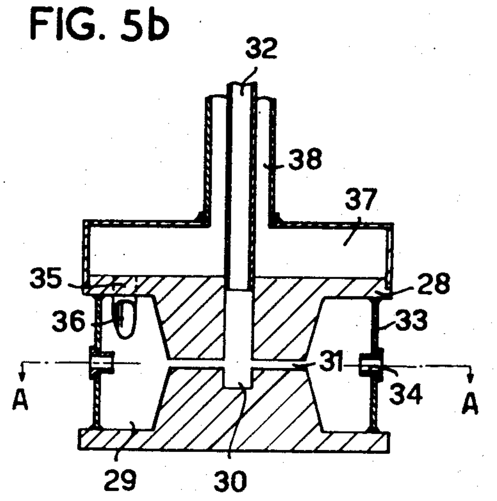

Figure 5*a* is a cross-sectional view of another modified form of the invention wherein a plurality of rotation chambers are combined and is taken on the line A—A of Figure 5*b*.

Figure 5*b* is a cross-sectional view taken on the line B—B of the apparatus shown in Figure 5*a*.

Figure 6A:
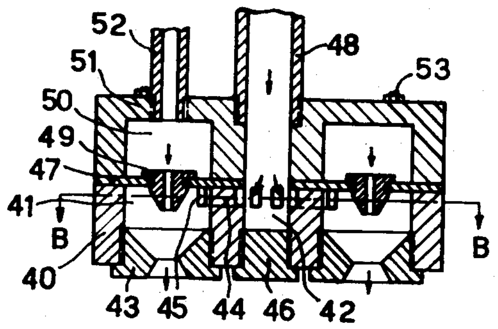
Figure 6B:
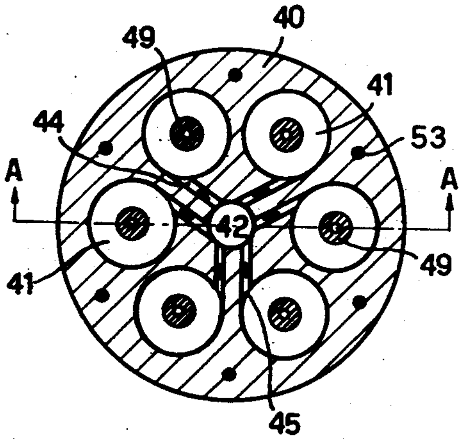

Figure 6*a* is a cross-sectional view of a still further modified form of the invention wherein a plurality of rotation chambers are combined and taken on the line A—A of Figure 6*b*.

Figure 6*b* is a cross-sectional view taken on the line B—B of the apparatus shown in Figure 6*a*.

The objects of the present invention are attained by using a process or an apparatus for accomplishing such a process in which a strong cyclonic current is generated in a liquid in which a second component is to be dispersed and by introducing the second component at or near the center of the cyclonic current.

By the term cyclonic current is understood a stationary rotating current whose tangential velocity component increases according as the radius of rotation decreases. Such a current can be produced when into a space, bounded by a continuous surface of revolution and provided with a central discharge aperture, said space being hereinafter termed rotation chamber, a liquid is introduced under pressure and in such a manner that at a radius larger than the radius of the discharge aperture a velocity with a relatively high tangentially directed component will be imparted to said liquid. This can be realized by forcing the liquid into the rotation chamber through substantially tangentially directed feed conduits or by supplying it to the rotation chamber in a substantially axial sense, the liquid being caused to start rotating around the axis of the rotation chamber by the shape of the feed conduits or by the provision of special elements in said feed conduits. For example when the liquid is supplied along the axis it may be introduced through an annular slot in which guide blades are arranged, or through spiralled channels.

When the liquid is supplied in a tangential direction, it may be entered through one feed conduit or through a number of feed conduits provided at set spacings at the circumference of the rotation chamber. Such a plurality of feed conduits is not as simple to construct, but offers the advantage of effecting a more symmetrical rotation, especially so when the material is supplied at lower velocities. The feed conduits may be tubes of a circular or angular section, and they may also be formed as mere slots in the wall of the rotation chamber. In the latter case, the liquid must be supplied from a space surrounding the rotation chamber.

The generation of a cyclonic current in a liquid causes the formation of a central hollow core filled with air or vapor of a relatively low pressure. When the dimensions of the rotation chamber have been properly selected, the pressure may fall so far as to become approximately equal to the vapor tension of the liquid used.

An important feature of the invention is the total inlet area of the tangential feed conduits in comparison with the area of the discharge aperture. A good aspirating effect is found when this total inlet area is equal to or larger than ¼ of the area of the discharge aperture.

According to a preferred embodiment of the invention this depression is availed of for aspirating the component which is to be mixed with or to be dispersed in the liquid. Also when the central supply is effected by the action of a certain pressure or by the application of a feeder member, use can be made of the aspirating effect of the depression created in the core. In that case a lower pressure may be applied in addition to which no extra measures have to be taken for preventing leakages.

The substances to be mixed or dispersed may be introduced into the rotation chamber through a suction conduit centrally debouching therein. Here, they get into the rapidly rotating liquid and are subjected to the high shearing stresses occurring in the liquid. Owing to the strong forces to which the individual particles are consequently subjected, a very fine dispersion or a rapid mixing is obtained.

Then, the resulting final product is spurted out through the centrally positioned discharge aperture.

In order to obtain a proper aspirating effect it is essential that the diameter of the suction aperture at the lower end of the suction pipe be smaller than that of the discharge aperture or at least that the resistance of the suction pipe to the rotating liquid be higher than the resistance of the discharge aperture and of the following discharge pipe, if used. If this condition is not fulfilled the rotating liquid may enter the suction conduit as a result of which the aspirating effect gets lost.

The suction aperture may be constituted by an aperture which in the wall of the rotation chamber is arranged centrally on the axis and opposite the discharge aperture. A suction pipe may be connected to said aperture. As a rule, the suction pipe will extend into the rotation chamber. It has appeared that the aspirating effect is only slightly dependent on the length of the suction pipe in the rotation chamber. The aspirating action gets lost only, when the suction pipe extends beyond the narrowest part of the discharge aperture. However, the length of the distance over which the suction pipe extends into the rotation chamber is determinative for the fineness of the dispersion. If the distance between the outlet of the suction pipe and the discharge aperture is made too small this will result in the formation of bigger particles.

The amount of liquid, which at a given pressure drop in the rotation chamber, can be forced through a given rotation chamber is practically independent of the amount of substance aspirated centrally. In consequence the ratio between the component to be dispersed and the dispersing liquid can be controlled in a simple manner with the help of a regulator valve provided in the suction pipe.

In this connection it is of great importance that an increase in the pressure drop in the rotation chamber is attended not only by an increase in the amount of liquid forced through the rotation chamber per unit of time, but also by a rise in the speed of rotation of the liquid, as a result of which the aspirating power, and hence the amount of substance aspirated, will increase too. With the apparatus according to invention, the mixing ratio is but little responsive to accidental pressure fluctuations in the feed of the dispersing or dissolving liquid. In this respect the apparatus according to the invention compare favourably with a known apparatus described in the British patent specification 362.430 according to which the liquids to be mixed or to be dispersed in each other are both tangentially supplied to the rotation chamber. Another advantage of the process according to the invention is that the substance to be mixed with or to be dispersed in the liquid is aspirated so that it need not be supplied under pressure. This is of particular importance when dealing with hazardous or highly corrosive substances. Moreover, it has appeared from extensive tests that in the application of a central infeed the components can be dispersed both more thoroughly and more quickly than in those cases where the components, whether or not roughly mixed previously, are both supplied tangentially.

The fineness of the resulting dispersion or the thoroughness of the mixture is not only affected by the aforementioned length of the suction pipe but also by the shape and size of the rotation chamber and especially by the diameter of the feed and discharge apertures. It has appeared that when the feed pressure is kept unaltered, a reduction of the dimensions of the rotation chamber results in a reduction of the particle size of the substance to be dispersed.

The dimensions of the rotation chamber remaining the same, an increase in the feed pressure produced a similar effect. As a result of this elevated pressure higher speeds of rotation are obtained so that also greater shearing stresses are produced. This has a reducing effect upon the particle size. When a solid granular material is introduced along the axis, the solid particles are subjected to the high shearing stresses as a result of which a very intense interaction occurs. When the shearing stresses are great, the forces exerted on said particles may become so great as to cause a disintegration thereof. In consequence the process according to the invention is also suited for preparing fine dispersions of solid substances. The process lends itself especially for dispersing solid substances consisting of secondary grains of conglomerated primary particles.

The rotation chamber may have various shapes. It is possible for example to use a cylindrical vessel having a central discharge aperture in one of its end walls and a suction aperture or suction pipe in the opposite end wall, the vessel being furthermore provided with one or more feed pipes in tangential relation thereto.

As a rule, a more or less conical shape is selected in which case various apex angles may be applied. Simple is the construction of those rotation chambers which are composed of a cylindrical part in which the feed pipes are provided and of an adjoining conical part in the apex of which the discharge pipe has been arranged. If, when viewed in the direction of the axis, the tangentially directed feed pipes are arranged at one side of the rotation chamber and the discharge at the other side, a single cyclonic current will be created in the vessel. If, when viewed in the direction of the axis, the feed pipes and the discharge are arranged at the same side, a double cyclonic current will occur. In the latter case, the liquid proceeds in a helical path along the wall to the other end of the chamber whence it returns along the axis to the discharge aperture. This movement is highly promoted by giving the opposite end the shape of a cone.

The current produced in this manner can be described as the current constituted by a rotating cylindrical sleeve surrounding a second cylindrical sleeve or cylinder which, owing to its smaller radius of rotation, has a far higher speed of rotation, while its direction of travel along the axis is opposed to that of the outer cylindrical sleeve.

The latter apparatus can be used advantageously for dispersing substances having a specific gravity higher than the specific gravity of the dispersing liquid. The substance to be dispersed is aspirated through the central suction aperture and drawn into the rapidly rotating central cylinder as a result of which the particles will not only be subjected to the high shearing stresses but also to a centrifugal force. Under the influence of this latter force said particles are driven towards the periphery, the coarser particles travelling a greater distance in a given length of time than the finer particles. In consequence, only particles smaller than a given maximum size will be present in the current squirting out through the discharge aperture. Particles over a given critical size have before that moment already disappeared from the central cylinder, leaving through the discharge aperture and have been entrained by the outer sleeve whose direction of travel along the axis is opposed to that of the inner one. The outer sleeve returns these particles to their starting point where they are introduced again into the central cylinder. This implies that particles bigger than a given critical size are recycled. In this manner a homogeneous product can be obtained.

It is possible to perform the process according to the invention in such a manner that two or more components are introduced separately, for example in a tangential direction, and that another component is aspirated along the axis. In that case the apparatus to be used should be provided with at least two tangentially directed feed conduits or sets of feed conduits. Another method is to introduce one component through a tangential feed pipe and to supply a second component through an axially directed annular split provided with guide blades, in which case a third component is aspirated.

According to the invention mixtures of more components can be prepared in this manner.

The resulting mixture squirts in a rotary fashion and at a high speed out of the discharge aperture. Owing to the high speed of rotation, the outgoing mixture has the shape of a hollow cone.

If the rotation chamber, with its discharge aperture pointing downwards, is positioned at a given distance from a liquid level, the material issues as a continuous rotating conical film which encloses a space where the pressure is lower than on the outside. As a result the liquid may even be sucked up.

If the discharge aperture is positioned below the level of some liquid, said aperture may be made wider without detracting from the aspirating effect. In this case there will be less danger of gas being aspirated through the discharge aperture, which would result in a reduction of the depression prevailing in the core. If a gas is being aspirated, the aspirating effect of the submerged rotation chamber is furthermore dependent on the distance between the discharge aperture of the rotation chamber and the level of the liquid because during aspirating also the hydrostatic pressure of the liquid is to be overcome.

In a storage tank or reaction vessel into which the resulting mixture is discharged, the rapid motion of the issuing material may be utilized for stirring the material already present in the vessel or at least for generating circulating currents therein.

By providing the discharge aperture with a diffusor it is also possible to recover part of the kinetic energy of the issuing mixture in the form of static pressure. Without detracting from the efficiency of the apparatus, the application of such a diffusor makes it possible to reduce the feed pressure of the primary liquid or to utilize the recovered pressure for operating a following rotation chamber.

Raising the capacity of the apparatus cannot be realized by merely increasing the size of the rotation chambers. In order to obtain a dispersion of the same fineness it is necessary in that case to raise the feed pressure considerably. From an energy point of view it will then be of advantage to operate several small rotation chambers in parallel. These rotation chambers operating in parallel may be combined to form a constructional unit provided with one supply pipe for the dispersing liquid, one suction pipe and/or one discharge pipe.

The dispersion, emulsion or mixture discharging from the first rotation chamber or group of rotation chambers may also be subjected to the action of cyclonic currents in rotation chambers arranged in series with the first, during which treatments other substances may be aspirated if necessary.

Figure 1:
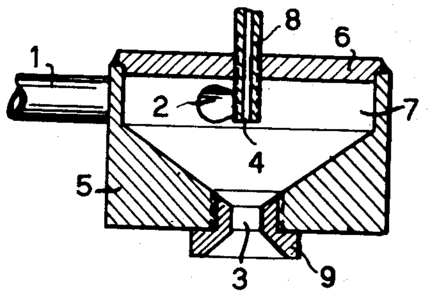
Figure 1 is a cross-sectional view of the apparatus.
Figure 2:
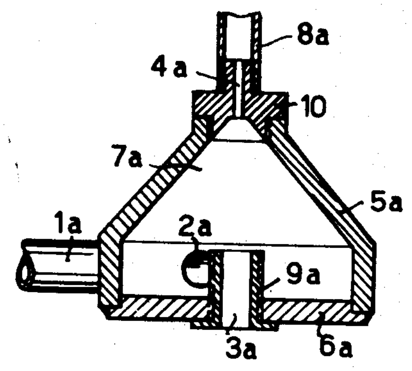
Figure 2 is a cross-sectional view of a modified form of the apparatus shown in Figure 1 but wherein the tangential liquid feed conduit enters at the end adjacent the discharge aperture.

Referring now to the drawings wherein like reference numerals represent like or similar parts, Figures 1 and 2 are diagrams showing a sectional view of two apparatus according to the invention. The liquid in each of the apparatus is supplied under pressure through the tangential feed pipes 1 and 1a respectively and flows through the feed apertures 2 and 2a respectively in a tangential direction into the rotation chambers 7 and 7a respectively, which has been hollowed out in the blocks 5 and 5a respectively and is covered by plates 6 and 6a respectively. The material is discharged through the openings 3 and 3a respectively in the nozzles 9 and 9a respectively, the nozzles being screwed into the block 5 and the plate 6a respectively. As the radius of the discharge aperture is considerably smaller than the radius on which the feed is introduced, the rotating current in the rotation chambers 7 and 7a respectively changes into a rapid cyclonic current so that the liquid issuing through the nozzles 9 and 9a respectively has the shape of a rotating hollow cone.

In the rotation chamber shown in Fig. 1, a simple cyclonic current is produced in which the direction of the axial velocity component of the liquid remains unchanged. In the rotation chamber shown in Fig. 2, the discharge and feed apertures are located at the same side as a result of which a double cyclonic current is produced. The liquid passes along the wall of the rotation chamber towards the end opposite the discharge aperture; from this point the liquid proceeds in the shape of a rapidly rotating cylindrical sleeve towards the discharge aperture. In both cases a hollow core is formed along the center in which a depression prevails. With the help of this depression the component to be mixed with the liquid can be aspirated. In the construction shown in Fig. 1 a suction pipe 8 has, to this end, been provided in the plate 6 opposite the discharge aperture. Said suction pipe 8 has been given a considerable smaller diameter than the discharge aperture in order to prevent the liquid current in the rotation chamber from becoming irregular.

For, if the resistance of the suction pipe is great, for instance because the dosing of the component to be aspirated is temporarily stopped, the depression in the rotation chamber and in the lower part of the suction pipe becomes gradually greater. As a result thereof, the speed of rotation increases and the diameter of the hollow core decreases.

Now if the suction aperture should be too wide the rotating liquid could pass through it into the suction pipe, annihilating the depression in that pipe. Subsequently the suction pipe is again emptied, and so on, so that a more or less regularly pulsating liquid current is generated, which is undesirable because it disturbs the suction mechanism.

In the rotation chamber shown in Fig. 2, the suction aperture 4a is constituted by a central bore in the screw 10 to which the suction pipe 8a has been connected. The rotation chamber according to Fig. 2 is specially suited for making a mixture or a fine dispersion of a liquid and a substance or a mixture of substances having a higher specific gravity than said liquid, which is a result of the fact that this construction, unlike that according to Fig. 1, has the advantage that a recirculation can occur therein. As regards the dispersing or dissolving of specifically lighter substances, this apparatus does not present any advantages over the construction of Fig. 1.

Figures 3a and 3b illustrate an apparatus according to the invention which is specially suited for being used below the level of a liquid, because the feed pipes for the liquid and for the substance to be aspirated run parallel and are both arranged at the top.

In Figures 3a and 3b, the rotation chamber 11 is constituted by the cylindrical wall 12 and the end walls 14 and 15. A number of tangentially directed tapering slots 13, through which the liquid is introduced, have been arranged in the cylindrical wall. Surrounding the rotation chamber, is a chamber 16 which is provided with a feed conduit 17. The rotation chamber is provided with a nozzle 22 having a centrally arranged round aperture 23 through which the liquid is discharged. It may be well to note, that the nozzle 23 is a diffusor in this modification as are the nozzles in modifications shown in Figures 1, 4a and 6a. However, it is now evident that the nozzle may be of the type shown in Figures 2 and 5a.

A liquid introduced under pressure through the feed pipe 17 flows through the chamber 16 and the feed slots 13 into the rotation chamber so that a cyclonic current is generated in said chamber. The liquid leaves the rotation chamber through the discharge aperture 23.

The suction pipe 19, arranged in the wall 15, can be moved up and down through the guide 18 which is provided with a packing 21 and a sealing ring 20. In order to control the supply of aspirated material, a valve 24 may be mounted in the suction pipe.

Figures 4a and 4b represent an apparatus which is specially suited for aspirating finely divided solid mixtures or liquid mixtures of a high viscosity. The rotation chamber 7b has two tangentially directed feed pipes 1b which in this construction have been given a rectangular cross section so that also the feed apertures 2b in the cylindrical part of the rotation chamber are rectangular in cross section.

The discharge aperture 3b is formed in the nozzle 9b which, with respect to the axis, is mounted in the wall at the end where the feed pipes for the liquid are arranged. As a result of this construction a double cyclonic current will be produced in the rotation chamber when the liquid is supplied under pressure through the feed pipes 1b, so that the substance to be dispersed can be recirculated. The suction pipe 8b, arranged opposite the discharge aperture 3b, is provided with a screw conveyor 25 to which the material is supplied from the hopper 26. By means of the screw 27, the suction pipe is coupled to the casing 5b of the rotation chamber 7b.

This apparatus is specially suited for making two liquids react with each other in the presence of a third substance, for example a catalyst. The two liquid reaction components may in that case be separately introduced through the feed pipes 1b and the catalyst be aspirated through the suction pipe 8b, its transport being facilitated by the screw conveyor 25.

Figures 5a, 5b and 6a, 6b show two instances of apparatus in which several rotation chambers have been combined to form a bigger unit.

The rotation chambers 29, the central suction chamber 30 and the separate suction pipes 31 of the apparatus shown in Figs. 5a and 5b have been formed in a cylindrical block 28. A suction pipe 32 is connected to the central suction chamber. The rotation chambers are shut off by the plates 33 into which the nozzles 34 are screwed. On the cylindrical block 28, there is provided a chamber for the liquid 37 which has a feed pipe 38. Through the tangentially directed feed pipes 35, whose outlets 36 open into the rotation chambers 29, the liquid which along the pipe 38 is forced into the chamber 37 can flow into the rotation chambers, so that here a cyclonic current is generated and the second component can be aspirated through the pipe 32, the central chamber 30 and the suction pipes 31. An apparatus of this type is specially suited for airing liquids in a tank. The aspirated air, finely divided in the liquid, is squirted out in a horizontal direction. As a result, circulating currents are produced in the tank so that the entire contents are rapidly contacted with oxygen.

In Figs. 6*a* and 6*b*, 40 represents a cylindrical block in which six rotation chambers 41 and a central bore 42 have been formed. The bottom of each rotation chamber is constituted by a screw 43 in which the profile of the conical part of the rotation chamber and the outlet have been hollowed out. The lower end of the central bore is shut off by a screw 46. Formed in the block 40, are furthermore the feed pipes 44 which are arranged in tangential relation to the rotation chamber, said feed pipes having their outlets 45 opened into the rotation chambers.

At the top, the rotation chambers and the feed pipes are covered by a plate 47. In this plate are inserted the suction pipes 49 whose centerlines coincide with the axis of the rotation chambers. The common suction chamber 50 consists of an annular space formed in the cylindrical block 51 which in its turn is provided with a central bore. Screwed into the block are the suction pipe 52 and the feed pipe 48 for the liquid. The blocks 51 and 40 may be attached for example by means of drawbolts 53. If necessary, a plate of some resilient material may be inserted between the plate 47 and the blocks so as to prevent leakage.

If liquid is supplied under pressure through the pipe 48, the liquid will pass through the bore 42, the tangential feed pipes 44 and the feed apertures 45 and enter the rotation chambers 41 where a rapid cyclonic current is produced. The liquid leaves the rotation chambers through the discharge apertures in the nozzles 43. Owing to the cyclonic current a depression is formed in the centre of the rotation chambers so that a second component can be aspirated through the suction pipes 49, the suction chamber 50 and the suction pipe 52.

The apparatus is specially suited for dissolving or dispersing a gas or a liquid of low viscosity in a liquid. The capacity of this apparatus is, just as of the one shown in Figs. 5*a* and *b*, raised by increasing the number of rotation chambers, while the fineness of the resulting dispersion remains unaltered and the feed pressure needs not to be increased.

The terminology employed in the specification is for the purpose of description and not of limitation of the scope of the invention being indicated in the claims.

We claim:

1. In an apparatus for dispersing a substance in a liquid a number of equal rotation chambers each rotation chamber having an inner wall being a continuous surface of revolution and being provided with one centrally arranged circular discharge aperture, feed conduits for the liquid debouching tangentially into each rotation chamber on a radius larger than the radius of said discharge aperture, a suction conduit for the substance to be dispersed debouching centrally and opposite said discharge aperture in each rotation chamber, the total inlet area of said tangential feed conduits being so large in comparison with the area of said discharge aperture that liquid when pressed through said tangential feed conduits into each rotation chamber will form a strong cyclonic current therein with a hollow core in which a depression prevails, the outlet diameter of said suction conduit being so small in comparison with the diameter of said discharge aperture that the outlet of said suction conduit is within the hollow core of said cyclonic current, said rotation chambers forming a constructional unit in such a manner that the tangential feed conduits of said rotation chamber are fed through a common feed conduit.

2. In an apparatus for dispersing a substance in a liquid a number of equal rotation chambers each rotation chamber having an inner wall being a continuous surface of revolution and being provided with one centrally arranged circular discharge aperture, feed conduits for the liquid debouching tangentially into each rotation chamber on a radius larger than the radius of said discharge aperture, a suction conduit for the substance to be dispersed debouching centrally and opposite said discharge aperture in each rotation chamber, the total inlet area of said tangential feed conduits being so large in comparison with the area of said discharge aperture that liquid when pressed through said tangential feed conduits into each rotation chamber will form a strong cyclonic current therein with a hollow core in which a depression prevails, the outlet diameter of said suction conduit being so small in comparison with the diameter of said discharge aperture that the outlet of said suction conduit is within the hollow core of said cyclonic current, said rotation chambers forming a constructional unit in such a manner that the suction conduits for the substance to be dispersed of said rotation chambers are fed through a common feed conduit.

3. In an apparatus for dispersing a substance in a liquid, the combination comprising a rotation chamber having an inner wall which is a continuous surface of revolution, said rotation chamber being provided with one centrally arranged circular discharge aperture; at least one feed conduit for the liquid debouching tangentially into said rotation chamber on a radius larger than the radius of said discharge aperture, the total inlet area of said feed conduit being larger than one-fourth of the area of said discharge aperture so that liquid pressed through said feed conduit into said rotation chamber will form a strong cyclonic current therein having a hollow core in which a depression prevails; a suction conduit for the substance to be dispersed debouching centrally and opposite said discharge aperture in said rotation chamber, the outlet diameter of said suction conduit being smaller than the diameter of said discharge aperture whereby the outlet of said suction conduit is within the hollow core of said cyclonic current.

4. In an apparatus for dispersing a substance in a liquid, the combination comprising a rotation chamber having an inner wall which is a continuous surface of revolution, said rotation chamber being provided with one centrally arranged circular discharge aperture; at least one feed conduit for the liquid debouching tangentially into said rotation chamber on a radius larger than the radius of said discharge aperture, the total inlet area of said feed conduit being larger than one-fourth of the area of said discharge aperture so that liquid pressed through said feed conduit into said rotation chamber will form a strong cyclonic current therein having a hollow core in which a depression prevails; a suction conduit for the substance to be dispersed extending centrally and axially into said rotation chamber and debouching therein opposite said discharge aperture, the section of said suction conduit extending into said rotation chamber being variable in length, the outlet diameter of said suction conduit being smaller than the diameter of said discharge aperture whereby the outlet of said suction conduit is within the hollow core of said cyclonic current.

5. In an apparatus for dispersing a substance in a liquid, the combination comprising a rotation chamber having an inner wall which is a continuous surface of revolution, said rotation chamber being provided with one centrally arranged circular discharge aperture, said discharge aperture being provided with a diffusor; at least one feed conduit for the liquid debouching tangentially into said rotation chamber on a radius larger than the radius of said discharge aperture, the total inlet area of said feed conduit being larger than one-fourth of the area of said discharge aperture so that liquid pressed through said feed conduit into said rotation chamber will form a strong cyclonic current therein having a hollow core in which a depression prevails; a suction conduit for the substance to be dispersed debouching centrally and opposite said discharge aperture in said rotation chamber, the outlet diameter of said suction conduit being smaller than the diameter of said discharge aperture whereby the outlet of said suction conduit is within the hollow core of said cyclonic current.

6. In an apparatus for dispersing a substance in a liquid the combination comprising a rotation chamber having an inner wall which is a continuous surface of revolution, said rotation chamber being provided with one centrally arranged circular discharge aperture; at least one feed conduit for the liquid dobouching tangentially into said rotation chamber on a radius larger than the radius of said discharge aperture and entering said rotation chamber at the end adjacent said central discharge aperture, the total inlet area of said feed conduit being larger than one-fourth of the area of said discharge aperture so that liquid pressed through said feed conduit into said rotation chamber will form a strong cyclonic current therein having a hollow core in which a depression prevails; a suction conduit for the substance to be dispersed debouching centrally and opposite said discharge aperture in said rotation chamber, the outlet diameter of said suction conduit being smaller than the diameter of said discharge aperture whereby the outlet of said suction conduit is within the hollow core of said cyclonic current.

7. In an apparatus for dispersing a substance in a liquid, the combination comprising a rotation chamber having an inner wall which is a continuous surface of revolution, said rotation chamber being provided with one centrally arranged circular discharge aperture including a short cylindrical pipe extending into the rotation chamber; at least one feed conduit for the liquid debouching tangentially into said rotation chamber on a radius larger than the radius of said discharge aperture and entering said rotation chamber at the end adjacent said central discharge aperture, the total inlet area of said feed conduit being larger than one-fourth of the area of said discharge aperture so that liquid pressed through said feed conduit into said rotation chamber will form a strong cyclonic current therein having a hollow core in which a depression prevails; a suction conduit for the substance to be dispersed debouching centrally and opposite said discharge aperture in said rotation chamber, the outlet diameter of said suction conduit being smaller than the diameter of said discharge aperture whereby the outlet of said suction conduit is within the hollow core of said cyclonic current.

8. In an apparatus for dispersing a substance in a liquid, the combination comprising a rotation chamber having an inner wall which is a continuous surface of revolution, said rotation chamber being provided with one centrally arranged circular discharge aperture; at least one feed conduit for the liquid debouching tangentially into said rotation chamber on a radius larger than the radius of said discharge aperture, the total inlet area of said feed conduit being larger than one fourth of the area of said discharge aperture so that liquid pressed through said feed conduit into said rotation chamber will form a strong cyclonic current therein having a hollow core in which a depression prevails; a suction conduit having a screw conveyor therein for transporting the substance to be dispersed, said suction conduit debouching centrally and opposite said discharge aperture in said rotation chamber, the outlet diameter of said suction conduit being smaller than the diameter of said discharge aperture whereby the outlet of said suction conduit is within the hollow core of said cyclonic current.

9. A process for dispersing a substance in a liquid, comprising flowing a liquid tangentially into a chamber and generating a strong cyclonic current having a hollow core with a depression therein, subjecting a substance to be dispersed to the high shearing stresses generated in the cyclonic current by aspirating said substance into said cyclonic current under the influence of the depression prevailing in the core, and discharging the dispersed substance in the liquid axially of the cyclonic current.

10. A process of the type described in claim 9 wherein the discharging of the dispersed substance in the liquid axially of the cyclonic current is below the level of the liquid.

11. A process for dispersing a substance in a mixture of liquids, comprising flowing at least two liquids separately and tangentially into a chamber where said liquids are mixed and generating a strong cyclonic current having a hollow core with a depression therein, subjecting a substance to be dispersed to the high shearing stresses generated in the cyclonic current by aspirating said substance of the said cyclonic current under the influence of the depression prevailing in the core and discharging the dispersed substance in the mixture of liquids axially of the cyclonic current.

12. A process for dispersing a gas in a liquid, comprising flowing a liquid tangentially into a chamber and generating a strong cyclonic current having a hollow core with a depression therein, subjecting a gas to be dispersed to the high shearing stresses generated in the cyclonic current by aspirating said gas into said cyclonic current under the influence of the depression prevailing in the core and discharging the dispersed gas in the liquid axially of the cyclonic current.

13. A process for dispersing a liquid in a liquid, comprising flowing a liquid tangentially into a chamber and generating a strong cyclonic current having a hollow core with a depression therein, subjecting a second liquid to be dispersed to the high shearing stresses generated in the cyclonic current by aspirating said second liquid into said cyclonic current under the influence of the depression prevailing in the core, and discharging the liquids axially of the cyclonic current.

14. A process for mixing two liquids, comprising flowing one liquid tangentially into a chamber and generating a strong cyclonic current having a hollow core with a depression therein, subjecting a second liquid to the high shearing stresses generated in the cyclonic current by aspirating said second liquid into said cyclonic current under the influence of the depression prevailing in the core, and discharging the mixed liquids axially of the cyclonic current.

15. A process for dispersing a granular substance in a liquid, comprising flowing a liquid tangentially into a chamber and generating a strong cyclonic current having a hollow core with a depression therein, subjecting a granular substance to be dispersed to the high shearing stresses generated in the cyclonic current by aspirating said granular substance into said cyclonic current under the influence of the depression prevailing in the core and discharging the dispersed granular substance in the liquid axially of the cyclonic current.

FREERK J. FONTEIN.
ARTHUR L. DE GELDER.

References Cited in the file of this patent

UNITED STATES PATENTS

| Number | Name | Date |
|---|---|---|
| 1,842,877 | Muller et al. | Jan. 26, 1932 |
| 2,193,005 | Ish-Shalom | Mar. 12, 1940 |
| 2,262,940 | Ish-Shalom | Nov. 18, 1941 |
| 2,534,253 | Fash | Dec. 19, 1950 |